US009466171B2

(12) United States Patent
Hornik et al.

(10) Patent No.: US 9,466,171 B2
(45) Date of Patent: Oct. 11, 2016

(54) SYSTEM AND METHOD FOR PROVIDING BENEFITS ON WAGERING AND NON-WAGERING NETWORKS

(71) Applicant: WMS Gaming Inc., Waukegan, IL (US)

(72) Inventors: Jeremy M. Hornik, Chicago, IL (US); Jamie W. Vann, Chicago, IL (US); Joel R. Jaffe, Glenview, IL (US); Dion K. Aoki, Henderson, NV (US); Dean Ehrlich, Arlington Heights, IL (US); Candice Savino, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 309 days.

(21) Appl. No.: 14/337,818

(22) Filed: Jul. 22, 2014

(65) Prior Publication Data

US 2014/0335944 A1 Nov. 13, 2014

Related U.S. Application Data

(62) Division of application No. 13/630,734, filed on Sep. 28, 2012, now abandoned.

(60) Provisional application No. 61/541,227, filed on Sep. 30, 2011.

(51) Int. Cl.
*G06F 17/00* (2006.01)
*G06F 19/00* (2011.01)
*G07F 17/32* (2006.01)

(52) U.S. Cl.
CPC ....... *G07F 17/3227* (2013.01); *G07F 17/3237* (2013.01); *G07F 17/3255* (2013.01)

(58) Field of Classification Search
CPC ............... G07F 17/32; G07F 17/3225; G07F 17/3227; G07F 17/3237; G07F 17/3239; G07F 17/3244; G07F 17/3248; G07F 17/3251; G07F 17/3255; G07F 17/3267; G07F 17/3281; G07F 17/34
See application file for complete search history.

(56) References Cited

U.S. PATENT DOCUMENTS 4,342,454 A 8/1982 Baer et al. ...................... 273/85
4,575,622 A 3/1986 Pellegrini .................... 235/382

(Continued)

FOREIGN PATENT DOCUMENTS

DE 4200254 8/1993 ............ G07F 17/32
DE 4236968 5/1994 ............ G07F 17/32

(Continued)

OTHER PUBLICATIONS

U.S. Appl. No. 60/200,329 dated Apr. 28, 2000, 8 pages.

*Primary Examiner* — Milap Shah
(74) *Attorney, Agent, or Firm* — Nixon Peabody LLP

(57) ABSTRACT

A gaming system community server communications controller sends information to a wagering-game server. A community server processor obtains gaming session information relating to a player's gaming session from the wagering-game server or wagering-game machine. The system determines whether the gaming session information satisfies a condition precedent to an award of player profile content comprising a currency in a community server secondary economy, game content available to the player on the community server, non-game content available to the player on the community server, game content available to the wagering-game machine player, non-game content available to the wagering-game machine player, and/or game content available to the player from the wagering-game server. The player profile content is stored in association with the player identified in the gaming session information and the information sent to the wagering-game server by the communications controller includes information relating to a location-based incentive available to the player.

26 Claims, 4 Drawing Sheets

(56) References Cited

U.S. PATENT DOCUMENTS

| | | | | |
|---|---|---|---|---|
| 4,752,068 | A | 6/1988 | Endo | 273/1 E |
| 4,764,666 | A | 8/1988 | Bergeron | 235/380 |
| 4,858,930 | A | 8/1989 | Sato | 273/85 |
| 4,882,473 | A | 11/1989 | Bergeron et al. | 235/380 |
| 4,948,138 | A | 8/1990 | Pease et al. | 273/138 |
| 5,014,982 | A | 5/1991 | Okada et al. | 273/435 |
| 5,018,736 | A | 5/1991 | Pearson et al. | 273/439 |
| 5,179,517 | A | 1/1993 | Sarbin et al. | 364/410 |
| 5,265,874 | A | 11/1993 | Dickinson et al. | 273/138 |
| 5,292,127 | A | 3/1994 | Kelly et al. | 273/138 R |
| 5,321,241 | A | 6/1994 | Craine | 235/380 |
| 5,370,306 | A | 12/1994 | Schulze et al. | 273/138 |
| 5,370,399 | A | 12/1994 | Liverance | 273/434 |
| 5,393,057 | A | 2/1995 | Marnell, II | 273/85 |
| 5,429,361 | A | 7/1995 | Raven et al. | 273/138 |
| 5,470,079 | A | 11/1995 | LeStrange et al. | 273/138 |
| 5,533,727 | A | 7/1996 | DeMar | 463/23 |
| 5,547,202 | A | 8/1996 | Tsumura | 463/29 |
| 5,551,692 | A | 9/1996 | Pettit et al. | 273/143 R |
| 5,575,474 | A | 11/1996 | Rossides | 463/26 |
| 5,580,053 | A | 12/1996 | Crouch | 463/20 |
| 5,580,309 | A | 12/1996 | Piechowiak et al. | 463/16 |
| 5,586,766 | A | 12/1996 | Forte et al. | 273/309 |
| 5,586,936 | A | 12/1996 | Bennett et al. | 463/25 |
| 5,609,525 | A | 3/1997 | Ohno et al. | 463/43 |
| 5,655,961 | A | 8/1997 | Acres et al. | 463/27 |
| 5,674,128 | A | 10/1997 | Holch et al. | 463/42 |
| 5,702,304 | A | 12/1997 | Acres et al. | 463/29 |
| 5,741,183 | A | 4/1998 | Acres et al. | 463/42 |
| 5,743,523 | A | 4/1998 | Kelly et al. | 273/138.1 |
| 5,743,800 | A | 4/1998 | Huard et al. | 463/26 |
| 5,752,882 | A | 5/1998 | Acres et al. | 463/42 |
| 5,761,647 | A | 6/1998 | Bohy | 705/10 |
| 5,770,533 | A | 6/1998 | Franchi | 463/42 |
| 5,816,918 | A | 10/1998 | Kelly et al. | 463/16 |
| 5,820,459 | A | 10/1998 | Acres et al. | 463/25 |
| 5,833,537 | A | 11/1998 | Barrie | 463/21 |
| 5,833,540 | A | 11/1998 | Miodunski et al. | 463/42 |
| 5,836,817 | A | 11/1998 | Acres et al. | 463/26 |
| 5,882,258 | A | 3/1999 | Kelly et al. | 463/11 |
| 5,902,983 | A | 5/1999 | Crevelt et al. | 235/380 |
| 5,919,091 | A | 7/1999 | Bell et al. | 463/25 |
| 5,931,467 | A | 8/1999 | Kamille | 273/139 |
| 5,957,775 | A | 9/1999 | Cherry | 463/16 |
| 5,983,196 | A | 11/1999 | Wendkos | 705/14 |
| 5,997,401 | A | 12/1999 | Crawford | 463/20 |
| 6,003,013 | A | 12/1999 | Boushy et al. | 705/7 |
| 6,004,211 | A | 12/1999 | Brenner et al. | 463/40 |
| 6,007,426 | A | 12/1999 | Kelly et al. | 463/16 |
| 6,009,412 | A | 12/1999 | Storey | 705/14 |
| 6,012,045 | A | 1/2000 | Barzilai et al. | 705/37 |
| 6,012,983 | A | 1/2000 | Walker et al. | 463/20 |
| 6,015,344 | A | 1/2000 | Kelly et al. | 463/16 |
| 6,048,269 | A | 4/2000 | Burns et al. | 463/25 |
| 6,061,660 | A | 5/2000 | Eggleston et al. | 705/14 |
| 6,068,552 | A | 5/2000 | Walker et al. | 463/21 |
| 6,068,553 | A | 5/2000 | Parker | 463/27 |
| 6,077,163 | A | 6/2000 | Walker et al. | 463/20 |
| 6,110,041 | A | 8/2000 | Walker et al. | 463/20 |
| 6,113,098 | A | 9/2000 | Adams | 273/143 |
| 6,113,493 | A | 9/2000 | Walker et al. | 463/25 |
| 6,162,122 | A | 12/2000 | Acres et al. | 463/29 |
| 6,165,071 | A | 12/2000 | Weiss | 463/24 |
| 6,178,408 | B1 | 1/2001 | Copple et al. | 705/14 |
| 6,179,710 | B1 | 1/2001 | Sawyer et al. | 463/16 |
| 6,193,608 | B1 | 2/2001 | Walker et al. | 463/25 |
| 6,203,430 | B1 | 3/2001 | Walker et al. | 463/20 |
| 6,227,972 | B1 | 5/2001 | Walker et al. | 463/25 |
| 6,231,445 | B1 | 5/2001 | Acres | 463/42 |
| 6,234,896 | B1 | 5/2001 | Walker et al. | 463/16 |
| 6,244,958 | B1 | 6/2001 | Acres | 463/26 |
| 6,251,014 | B1 | 6/2001 | Stockdale et al. | 463/16 |
| 6,254,481 | B1 | 7/2001 | Jaffe | 463/20 |
| 6,254,483 | B1 | 7/2001 | Acres | 463/26 |

| | | | | |
|---|---|---|---|---|
| 6,267,671 | B1 * | 7/2001 | Hogan | A63F 3/00157 463/25 |
| 6,273,820 | B1 | 8/2001 | Haste, III | 463/40 |
| 6,280,326 | B1 | 8/2001 | Saunders | 463/25 |
| 6,293,866 | B1 | 9/2001 | Walker et al. | 463/20 |
| 6,302,790 | B1 | 10/2001 | Brossard | 463/20 |
| 6,302,793 | B1 | 10/2001 | Fertitta, III et al. | 463/25 |
| 6,311,976 | B1 | 11/2001 | Yoseloff et al. | 273/138 |
| 6,312,334 | B1 | 11/2001 | Yoseloff | 705/14 |
| 6,319,122 | B1 * | 11/2001 | Packes, Jr. | G07F 17/32 273/138.1 |
| 6,319,127 | B1 | 11/2001 | Walker et al. | 463/26 |
| 6,334,613 | B1 | 1/2002 | Yoseloff | 463/21 |
| 6,340,331 | B1 | 1/2002 | Saunders et al. | 463/20 |
| 6,364,765 | B1 | 4/2002 | Walker et al. | 273/143 |
| 6,364,766 | B1 | 4/2002 | Anderson et al. | 463/16 |
| 6,371,852 | B1 | 4/2002 | Acres | 463/25 |
| 6,394,900 | B1 | 5/2002 | McGlone et al. | 463/29 |
| 6,394,907 | B1 | 5/2002 | Rowe | 463/24 |
| 6,398,650 | B1 | 6/2002 | Horigami et al. | 705/14 |
| 6,431,983 | B2 | 8/2002 | Acres | 463/25 |
| 6,506,117 | B2 | 1/2003 | DeMar et al. | 463/20 |
| 6,506,118 | B1 | 1/2003 | Baerlocher et al. | 463/25 |
| 6,533,273 | B2 | 3/2003 | Cole et al. | 273/138 |
| 6,540,609 | B1 | 4/2003 | Paige | 463/25 |
| 6,592,456 | B2 | 7/2003 | Walker et al. | 463/20 |
| 6,592,457 | B1 | 7/2003 | Frohm et al. | 463/25 |
| 6,605,001 | B1 | 8/2003 | Tarantino | 705/14 |
| 6,609,975 | B1 | 8/2003 | Sawyer et al. | 463/26 |
| 6,612,575 | B1 | 9/2003 | Cole et al. | 273/138 |
| 6,663,489 | B2 | 12/2003 | Baerlocher | 463/20 |
| 6,682,421 | B1 | 1/2004 | Rowe et al. | 463/25 |
| 6,692,353 | B2 | 2/2004 | Walker et al. | 463/16 |
| 6,722,981 | B2 | 4/2004 | Kaminkow et al. | 463/25 |
| 6,722,985 | B2 | 4/2004 | Criss-Pzkiewicz et al. | 463/29 |
| 6,745,236 | B1 | 6/2004 | Hawkins et al. | 709/218 |
| 6,752,312 | B1 | 6/2004 | Chamberlain et al. | 235/375 |
| 6,758,757 | B2 | 7/2004 | Luciano, Jr. et al. | 463/43 |
| 6,776,713 | B2 | 8/2004 | Gaelmann | 463/16 |
| 6,780,111 | B2 | 8/2004 | Cannon et al. | 463/25 |
| 6,800,027 | B2 | 10/2004 | Giobbi et al. | 463/21 |
| 6,811,486 | B1 | 11/2004 | Luciano, Jr. | 463/24 |
| 6,840,860 | B1 | 1/2005 | Okuniewicz | 463/35 |
| 6,843,724 | B2 | 1/2005 | Walker et al. | 463/25 |
| 6,843,725 | B2 | 1/2005 | Nelson | 463/40 |
| 6,923,721 | B2 | 8/2005 | Luciano et al. | 463/24 |
| 6,967,566 | B2 | 11/2005 | Weston et al. | 340/323 |
| 7,008,321 | B2 | 3/2006 | Rowe et al. | 463/25 |
| 7,128,652 | B1 | 10/2006 | Lavoie et al. | 463/42 |
| 7,182,690 | B2 | 2/2007 | Giobbi et al. | 463/24 |
| 7,316,619 | B2 | 1/2008 | Nelson | 463/42 |
| 7,396,281 | B2 | 7/2008 | Mendelsohn et al. | 463/42 |
| 7,425,169 | B2 | 9/2008 | Ganz | 446/175 |
| 7,442,108 | B2 | 10/2008 | Ganz | 446/175 |
| 7,465,212 | B2 | 12/2008 | Ganz | 446/175 |
| 7,534,157 | B2 | 5/2009 | Ganz | 446/175 |
| 7,568,964 | B2 | 8/2009 | Ganz | 446/175 |
| 7,621,813 | B2 | 11/2009 | Bortnik et al. | 463/42 |
| 7,666,082 | B2 | 2/2010 | Kane et al. | 463/17 |
| 7,682,244 | B1 | 3/2010 | Luciano, Jr. et al. | 463/25 |
| 7,704,145 | B2 | 4/2010 | Glisson et al. | 463/25 |
| 2001/0024971 | A1 | 9/2001 | Brossard | 463/30 |
| 2001/0036864 | A1 * | 11/2001 | Melas | G07F 17/32 463/42 |
| 2001/0046893 | A1 | 11/2001 | Giobbi et al. | 463/24 |
| 2001/0048193 | A1 | 12/2001 | Yoseloff et al. | 273/138.1 |
| 2002/0028708 | A1 | 3/2002 | Busch et al. | 463/42 |
| 2002/0039919 | A1 | 4/2002 | Joshi et al. | 463/20 |
| 2002/0065123 | A1 * | 5/2002 | Packes, Jr. | G07F 17/32 463/16 |
| 2002/0074726 | A1 | 6/2002 | Yoseloff et al. | 273/274 |
| 2002/0077170 | A1 | 6/2002 | Johnson et al. | 463/16 |
| 2002/0077173 | A1 | 6/2002 | Luciano et al. | 463/25 |
| 2002/0077174 | A1 | 6/2002 | Luciano et al. | 463/25 |
| 2002/0090985 | A1 | 7/2002 | Tochner et al. | 463/1 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/20 |
| 2002/0151349 | A1 | 10/2002 | Joshi | 463/20 |

(56) References Cited

U.S. PATENT DOCUMENTS

| | | | | |
|---|---|---|---|---|
| 2002/0196342 | A1 | 12/2002 | Walker et al. | 348/157 |
| 2003/0013515 | A1 | 1/2003 | Rowe et al. | 463/25 |
| 2003/0013531 | A1 | 1/2003 | Rowe et al. | 463/42 |
| 2003/0018523 | A1 | 1/2003 | Rappaport et al. | 705/14 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0083943 | A1 | 5/2003 | Adams et al. | 705/14 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0119579 | A1 | 6/2003 | Walker et al. | 463/20 |
| 2003/0157979 | A1 | 8/2003 | Cannon et al. | 463/16 |
| 2003/0171149 | A1 | 9/2003 | Rothschild | 463/42 |
| 2003/0195024 | A1 | 10/2003 | Slattery | 463/9 |
| 2003/0211881 | A1 | 11/2003 | Walker et al. | 463/20 |
| 2004/0043806 | A1 | 3/2004 | Kirby et al. | 463/6 |
| 2004/0053680 | A1 | 3/2004 | Schultz | 463/20 |
| 2004/0087373 | A1 | 5/2004 | Choi | 463/42 |
| 2004/0142742 | A1 | 7/2004 | Schneider et al. | 463/25 |
| 2004/0143496 | A1* | 7/2004 | Saenz | G06Q 30/02 705/14.25 |
| 2004/0177007 | A1 | 9/2004 | Van Luchene | 705/26 |
| 2004/0209662 | A1 | 10/2004 | Wadleigh | 463/16 |
| 2004/0254010 | A1 | 12/2004 | Fine | 463/25 |
| 2005/0003886 | A1 | 1/2005 | Englman et al. | 463/25 |
| 2005/0014558 | A1* | 1/2005 | Estey | G07F 17/3237 463/29 |
| 2005/0033601 | A1 | 2/2005 | Kirby et al. | 705/1 |
| 2005/0043087 | A1 | 2/2005 | Seelig et al. | 463/25 |
| 2005/0159207 | A1 | 7/2005 | Thomas | 463/20 |
| 2005/0250567 | A1 | 11/2005 | Kane et al. | 463/16 |
| 2005/0250568 | A1 | 11/2005 | Kane et al. | 463/16 |
| 2005/0250569 | A1 | 11/2005 | Kane et al. | 463/16 |
| 2005/0250571 | A1 | 11/2005 | Kane et al. | 463/17 |
| 2005/0250572 | A1 | 11/2005 | Kane et al. | 463/17 |
| 2005/0250573 | A1 | 11/2005 | Kane et al. | 463/17 |
| 2005/0250574 | A1 | 11/2005 | Kane et al. | 463/17 |
| 2005/0250575 | A1 | 11/2005 | Kane et al. | 463/17 |
| 2005/0250576 | A1 | 11/2005 | Kane et al. | 463/17 |
| 2005/0287925 | A1 | 12/2005 | Proch et al. | 446/470 |
| 2006/0014579 | A1 | 1/2006 | Kane et al. | 463/17 |
| 2006/0025197 | A1 | 2/2006 | Kane et al. | 463/17 |
| 2006/0025213 | A1 | 2/2006 | Kane et al. | 463/29 |
| 2006/0030388 | A1 | 2/2006 | Kane et al. | 463/16 |
| 2006/0068876 | A1 | 3/2006 | Kane et al. | 463/16 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0082056 | A1 | 4/2006 | Kane et al. | 273/138.1 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2006/0121991 | A1 | 6/2006 | Borinik et al. | 463/43 |
| 2006/0122716 | A1 | 6/2006 | Borinik et al. | 700/91 |
| 2006/0154724 | A1 | 7/2006 | Okuniewicz | 463/29 |
| 2006/0154727 | A1 | 7/2006 | Okuniewicz | 463/42 |
| 2006/0172799 | A1 | 8/2006 | Kane et al. | 463/25 |
| 2006/0205461 | A1 | 9/2006 | La Rocca et al. | 463/1 |
| 2007/0077988 | A1* | 4/2007 | Friedman | G07F 17/32 463/25 |
| 2007/0117629 | A1 | 5/2007 | Fowler et al. | 463/42 |
| 2007/0173309 | A1 | 7/2007 | Rigsby | 463/16 |
| 2007/0173327 | A1 | 7/2007 | Kilgore et al. | 463/42 |
| 2007/0243928 | A1* | 10/2007 | Iddings | G07F 17/32 463/26 |
| 2007/0254734 | A1 | 11/2007 | Gilmore et al. | 463/20 |
| 2007/0254736 | A1 | 11/2007 | Hardy et al. | 463/25 |
| 2007/0257430 | A1 | 11/2007 | Hardy et al. | 273/139 |
| 2007/0259706 | A1 | 11/2007 | Anderson et al. | 463/16 |
| 2007/0259708 | A1 | 11/2007 | Hardy et al. | 463/463 |
| 2007/0259713 | A1 | 11/2007 | Fiden et al. | 463/25 |
| 2007/0259719 | A1 | 11/2007 | Kane | 463/43 |
| 2007/0265060 | A1 | 11/2007 | Hornik et al. | 463/20 |
| 2007/0265068 | A1 | 11/2007 | Kane et al. | 463/29 |
| 2007/0265091 | A1 | 11/2007 | Aguilar et al. | 463/42 |
| 2007/0298856 | A1 | 12/2007 | Gilmore et al. | 463/16 |
| 2008/0009336 | A1* | 1/2008 | Walker | G07F 17/32 463/16 |
| 2008/0045330 | A1 | 2/2008 | Chim | 463/25 |
| 2008/0090659 | A1 | 4/2008 | Aguilar et al. | 463/42 |
| 2008/0108406 | A1* | 5/2008 | Oberberger | G07F 17/32 463/16 |
| 2008/0113770 | A1 | 5/2008 | Gelber et al. | 463/25 |
| 2008/0146322 | A1 | 6/2008 | Hardy et al. | 463/25 |
| 2008/0146323 | A1 | 6/2008 | Hardy et al. | 463/25 |
| 2008/0146345 | A1 | 6/2008 | Hardy et al. | 463/42 |
| 2008/0146346 | A1 | 6/2008 | Hardy et al. | 463/42 |
| 2008/0214310 | A1* | 9/2008 | Brunet De Courssou | G07F 17/32 463/42 |
| 2008/0287187 | A1 | 11/2008 | Seelig et al. | 463/27 |
| 2008/0300049 | A1 | 12/2008 | Anderson et al. | 463/25 |
| 2009/0054148 | A1 | 2/2009 | Hardy et al. | 463/42 |
| 2009/0170608 | A1 | 7/2009 | Hermann et al. | 463/42 |
| 2009/0170610 | A1 | 7/2009 | Hermann et al. | 463/43 |
| 2009/0170611 | A1 | 7/2009 | Hermann et al. | 463/43 |
| 2009/0170612 | A1 | 7/2009 | Hermann et al. | 463/43 |
| 2009/0170613 | A1 | 7/2009 | Hermann et al. | 463/43 |
| 2009/0170614 | A1 | 7/2009 | Hermann et al. | 463/43 |
| 2009/0176560 | A1 | 7/2009 | Hermann et al. | 463/25 |
| 2009/0176564 | A1 | 7/2009 | Hermann et al. | 463/29 |
| 2009/0176578 | A1 | 7/2009 | Hermann et al. | 463/43 |
| 2009/0176579 | A1 | 7/2009 | Hermann et al. | 463/43 |
| 2009/0176580 | A1 | 7/2009 | Hermann et al. | 463/43 |
| 2009/0191962 | A1 | 7/2009 | Hardy et al. | 463/29 |
| 2009/0264192 | A1 | 10/2009 | Visser | 463/27 |
| 2010/0016069 | A1 | 1/2010 | Hermann | 463/25 |
| 2010/0029376 | A1 | 2/2010 | Hardy et al. | 463/25 |
| 2010/0041472 | A1 | 2/2010 | Gagner et al. | 463/26 |
| 2010/0069148 | A1 | 3/2010 | Cargill | 463/25 |
| 2010/0317435 | A1* | 12/2010 | Velu | G07F 17/32 463/31 |
| 2011/0183749 | A1 | 7/2011 | Allen et al. | 463/25 |
| 2011/0207525 | A1 | 8/2011 | Allen et al. | 463/25 |
| 2012/0136465 | A1* | 5/2012 | Guinn | G07F 17/32 700/92 |

FOREIGN PATENT DOCUMENTS

| | | | |
|---|---|---|---|
| EP | 0 360 613 | 3/1990 | G07F 17/34 |
| EP | 0 431 723 | 6/1991 | A63F 9/22 |
| ES | 2028694 | 7/1992 | G07F 17/34 |
| GB | 2 241 098 | 8/1991 | G07F 7/08 |
| GB | 2 332 151 | 6/1999 | A63F 9/22 |
| JP | 60-106680 | 7/1985 | A63F 9/22 |
| JP | 2265584 | 10/1990 | A63F 7/02 |
| JP | 04-009177 | 1/1992 | A63F 9/22 |
| JP | 04-079977 | 3/1992 | A63F 9/00 |
| JP | 05-277233 | 10/1993 | A63F 7/02 |
| JP | 07-024128 | 1/1995 | A63F 7/02 |
| JP | 07-155453 | 6/1995 | A63F 7/02 |
| JP | 09-276500 | 10/1997 | A63F 7/02 |
| JP | 10-066777 | 3/1998 | A63F 7/02 |
| JP | 10-146423 | 6/1998 | A63F 7/02 |
| JP | 11-309246 | 11/1999 | A63F 7/02 |
| WO | WO 95/22811 | 8/1995 | G07F 17/32 |
| WO | WO 97/12338 | 4/1997 | G06F 161/00 |
| WO | WO 99/29381 | 6/1999 | G07F 17/32 |
| WO | WO 02/21467 | 3/2002 | G07F 17/32 |
| WO | WO 2005/020122 | 3/2005 | G06F 19/00 |
| WO | WO 2005/082480 | 9/2005 | A63F 13/00 |
| WO | WO 2005/110562 | 11/2005 | A63F 9/24 |
| WO | WO 2005/110566 | 11/2005 | A63F 13/00 |
| WO | WO 2006/002241 | 1/2006 | G07F 17/32 |
| WO | WO 2006/004831 | 1/2006 | G07F 17/32 |
| WO | WO 2006/004832 | 1/2006 | A63F 13/00 |
| WO | WO 2006/005073 | 1/2006 | |
| WO | WO 2006/017036 | 2/2006 | G07F 17/34 |
| WO | WO 2006/017067 | 2/2006 | A63F 13/00 |
| WO | WO 2006/017068 | 2/2006 | G07F 17/32 |
| WO | WO 2006/020811 | 2/2006 | G07F 17/32 |
| WO | WO 2006/026250 | 3/2006 | G07F 17/32 |

(56) References Cited

FOREIGN PATENT DOCUMENTS

| | | | |
|---|---|---|---|
| WO | WO 2006/044252 | 4/2006 | G07F 17/32 |
| WO | WO 2006/060436 | 6/2006 | A63F 13/00 |
| WO | WO 2006/060438 | 6/2006 | A63F 13/00 |
| WO | WO 2006/060442 | 6/2006 | A63F 13/00 |
| WO | WO 2006/060493 | 6/2006 | G07F 17/00 |
| WO | WO 2006/073934 | 7/2006 | A63F 9/24 |
| WO | WO 2006/074009 | 7/2006 | A63F 13/00 |
| WO | WO 2006/074010 | 7/2006 | A63F 13/00 |
| WO | WO 2006/074156 | 7/2006 | A63F 9/24 |
| WO | WO 2006/099398 | 9/2006 | A63F 13/00 |
| WO | WO 2006/124806 | 11/2006 | A63F 9/24 |
| WO | WO 2006/124812 | 11/2006 | A63F 9/24 |
| WO | WO 2006/125170 | 11/2006 | A63F 9/24 |
| WO | WO 2007/011621 | 1/2007 | G06F 17/00 |
| WO | WO 2007/035645 | 3/2007 | A63F 9/24 |
| WO | WO 2007/044785 | 4/2007 | A63F 9/24 |
| WO | WO 2007/067769 | 6/2007 | A63F 13/00 |
| WO | WO 2007/079150 | 7/2007 | A63F 3/06 |
| WO | WO 2007/079151 | 7/2007 | A63F 9/24 |
| WO | WO 2007/087286 | 8/2007 | A63F 9/24 |
| WO | WO 2007/092595 | 8/2007 | A63F 9/24 |
| WO | WO 2007/103054 | 9/2007 | G06F 19/00 |
| WO | WO 2007/130464 | 11/2007 | A63F 13/06 |
| WO | WO 2008/022323 | 2/2008 | A63F 9/24 |
| WO | WO 2008/048634 | 4/2008 | A63F 13/06 |
| WO | WO 2008/051796 | 5/2008 | G06F 19/00 |
| WO | WO 2008/060978 | 5/2008 | A63F 13/10 |
| WO | WO 2009/146366 | 3/2009 | A63F 9/24 |
| WO | WO 2009/086522 | 7/2009 | A63F 9/24 |
| WO | WO 2009/135045 | 11/2009 | A63F 13/00 |

* cited by examiner

SYSTEM AND METHOD FOR PROVIDING BENEFITS ON WAGERING AND NON-WAGERING NETWORKS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present concepts relates generally to a wagering game apparatus, a wagering game system, and methods for playing wagering game on a wagering game apparatus and/or system, and more particularly, to association of web services with one or more wagering game apparatuses, systems, gaming establishments.

BACKGROUND OF THE INVENTION

Wagering-game machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

According to one aspect of the present invention, a gaming system includes a community server operatively associated with a communications controller configured to send information to a wagering-game server and a physical memory. The physical memory device bears instructions which, when executed by processor operatively associated with the community server and the physical memory device, cause the community server to retrieve from, or to receive from, the wagering-game server or the wagering-game machine gaming session information relating to a player's gaming session on the wagering-game machine. The system also includes a processor configured to, upon execution of the instructions, determine whether the gaming session information satisfies a condition precedent to an award of player profile content comprising one or more of a currency in a secondary economy of the community server, game content available to the player on the community server, non-game content available to the player on the community server, game content available to the player on the wagering-game machine, non-game content available to the player on the wagering-game machine, and game content available to the player from the wagering-game server. The processor is also configured to, upon execution of the instructions, store the player profile content on the physical memory device in association with the player identified in the gaming session information. The information sent to the wagering-game server by the communications controller comprises information relating to a location-based incentive available to the player.

According to another aspect of the invention, a method of implementing a wagering incentive across a plurality of distinct networks, the first network being a non-wagering network operated by or for a first entity and the second network being a wagering network operatively associated with a wagering-game machine operated by or for a second entity distinct from the first entity, the method including offering, via a communications controller of a community server in the first network, an incentive to a participant of the first network to play a wagering game on the wagering-game machine of the second network and receiving information from the second network comprising wagering-game machine gaming session information relating to a player's gaming session on the wagering-game machine. The method also includes the act of determining, using a processor operatively associated with the first network, whether the gaming session information satisfies a condition precedent to an award of player profile content comprising one or more of a currency in a secondary economy of the first network, game content available to the player on the first network, non-game content available to the player on the first network, game content available to the player on the wagering-game machine, non-game content available to the player on the wagering-game machine, and game content available to the player from the wagering-game server. The method also includes the act of storing the player profile content on a physical memory device operatively associated with the first network in association with the player identified by the gaming session information.

According to another aspect of the invention, a method of implementing a wagering incentive across a plurality of distinct networks, the first network being a non-wagering network operated by or for a first entity and the second network being a wagering network operatively associated with a wagering-game machine operated by or for a second entity distinct from the first entity, includes the acts of offering, via a communications controller of a community server in said first network, an incentive to a participant of said first network to play a wagering game on said wagering-game machine of said second network and receiving information from the second network comprising wagering-game machine gaming session information relating to a player's gaming session on said wagering-game machine. The method also includes the acts of using the processor operatively associated with said first network to determine a number of points to be awarded in association with the gaming session information, add said number of points to a number of points stored in a player profile to yield a total number of points stored in the player profile, and compare the total number of points stored in the player profile to a total number of points stored in other player profiles for said wagering-game machine or comparing the total number of points stored in the player profile to a ranking schedule for said wagering-game machine. The method also includes the acts of using the processor operatively associated with said first network to determine if the total number of points stored in the player profile corresponds to a higher rank in said ranking schedule for said wagering-game machine and increase an incentive available in association with said player profile on said first network or on for said wagering-game machine of said second network if the total number of points stored in the player profile corresponds is determined to correspond to a higher rank in said ranking schedule for said wagering-game machine.

According to yet another aspect of the invention, a physical computer readable storage media is encoded with instructions for directing a networked system communicatively coupled to a wagering-game machine or a wagering-game server communicatively coupled to a wagering-game machine to perform the above methods.

Additional aspects of the invention will be apparent to those of ordinary skill in the art in view of the detailed description of various embodiments, which is made with reference to the drawings, a brief description of which is provided below.

Figure 1:
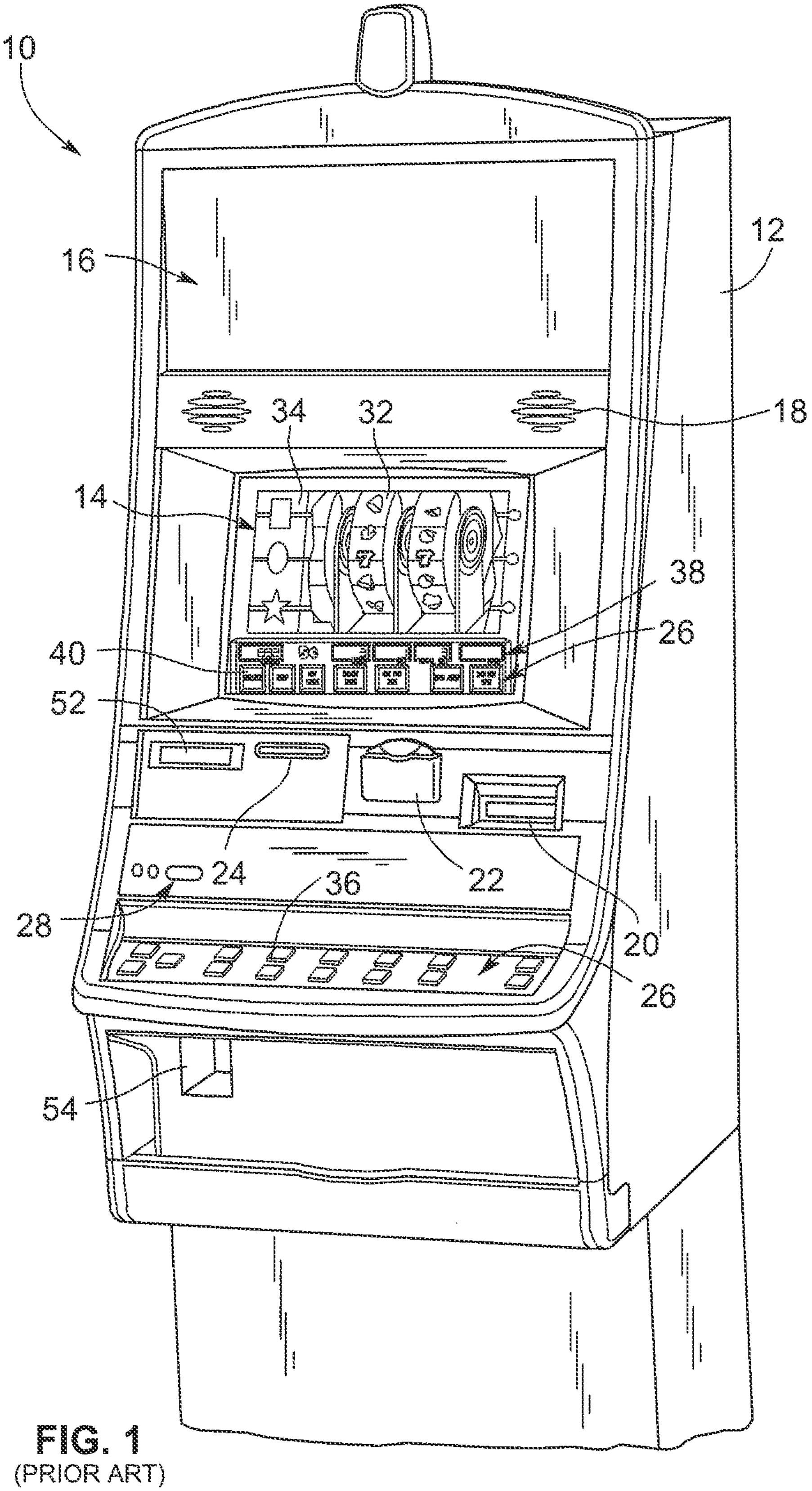
FIG. 1 (PRIOR ART)
FIG. 1 is a perspective view of a wagering game terminal utilizable in accord with the present concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all;" the word "any" means "any and all;" and the word "including" means "including without limitation."

Casino player clubs ("clubs") are often little more than passive tracking systems geared toward individual players. Many clubs track player activities inside casinos and give incentives based on player habits. For example, player clubs may track a players' wagering habits and offer incentives to increase wagering. Because many clubs are limited to such tracking-type programs, they often treat their members like service subscribers, rather than members of a true club and communications between clubs and players are often superficial and impersonal. For example, clubs often notify players about special promotions and complementary merchandise, but they typically do not facilitate communications between club members.

Unlike these passive, impersonal dubs, embodiments of the present concepts utilize web services to facilitate virtual player communities where community members regularly visit, make friends, and interact with each other and enable community members to establish social networks, provide and rate community content, assume community-related identities, and much more. Utilizing these web services, virtual gaming community environments can be linked to real-world casinos and/or wagering-game machines. For example, a in accord with at least some aspects of the present concepts enables on-line community members to participate in on-line activities that provide enhancements to subsequent wagering activities at one or more real-world casinos and/or wagering-game machines.

In general, the present concepts seek to incentivize players to return to a gaming establishment at which played and, in at least some aspects, to the gaming establishment in which they most recently played. In particular, the present concepts include methods and/or systems allowing a wagering-game machine manufacturer, or customers of the wagering-game machine manufacturer, to distribute site, gaming machine, and/or customer specific reward offers, or other communications, via a of the wagering-game machine manufacturer (e.g., Player's Life® Web Services of WMS Gaming Inc.).

Referring to FIG. 1, there is shown a wagering-game machine 10 similar to those used in gaming establishments, such as casinos. With regard to the present invention, the wagering-game machine 10 may be any type of wagering-game machine and may have varying structures and methods of operation. For example, in some aspects, the wagering-game machine 10 is be an electromechanical wagering-game machine configured to play mechanical slots, whereas in other aspects, the wagering-game machine is an electronic wagering-game machine configured to play a video casino game, such as slots, keno, poker, blackjack, roulette, craps, etc. In at least some aspects, the wagering-game machine or wagering-game machine 10 is a WMS Gaming BLUEBIRD®, BLUEBIRD® Slant Widescreen, BLUEBIRD2, BLUEBIRD xD, or BLUEBIRD xD™ platform.

It should be understood that although the wagering-game machine 10 is shown as a free-standing terminal of the upright type, the wagering-game machine is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top wagering-game machine, or other personal electronic device, such as a portable television, MP3 player, entertainment device, etcetera.

The wagering-game machine 10 illustrated in FIG. 1 comprises a cabinet or housing 12. For output devices, this embodiment of the wagering-game machine 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the wagering-game machine. For input devices, the wagering-game machine 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the wagering-game machine 10 are described below, it should be understood that numerous other peripheral devices and other elements exist and are readily utilizable in any number of combinations to create various forms of a wagering-game machine in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the wagering-game machine 10, or other form factor, such as is shown by way of example in FIG. 1. The primary display area 14 includes, in relation to many aspects of wagering games conducted on the wagering-game machine 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the wagering-game machine 10 relies upon the video display 34 only and not the mechanical reels 32, the mechanical reels 32 are optionally removed from the interior of the terminal and the video display 34 is advantageously of a non-transmissive type. Similarly, if the wagering game conducted via the wagering-game machine 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the wagering-game machine 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the wagering-game machine, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the wagering-game machine 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. U.S. Patent Publication No. 2010/0317442, published on Dec. 16, 2010, entitled "Wagering Game Community Environment," is also incorporated herein by reference in its entirety. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
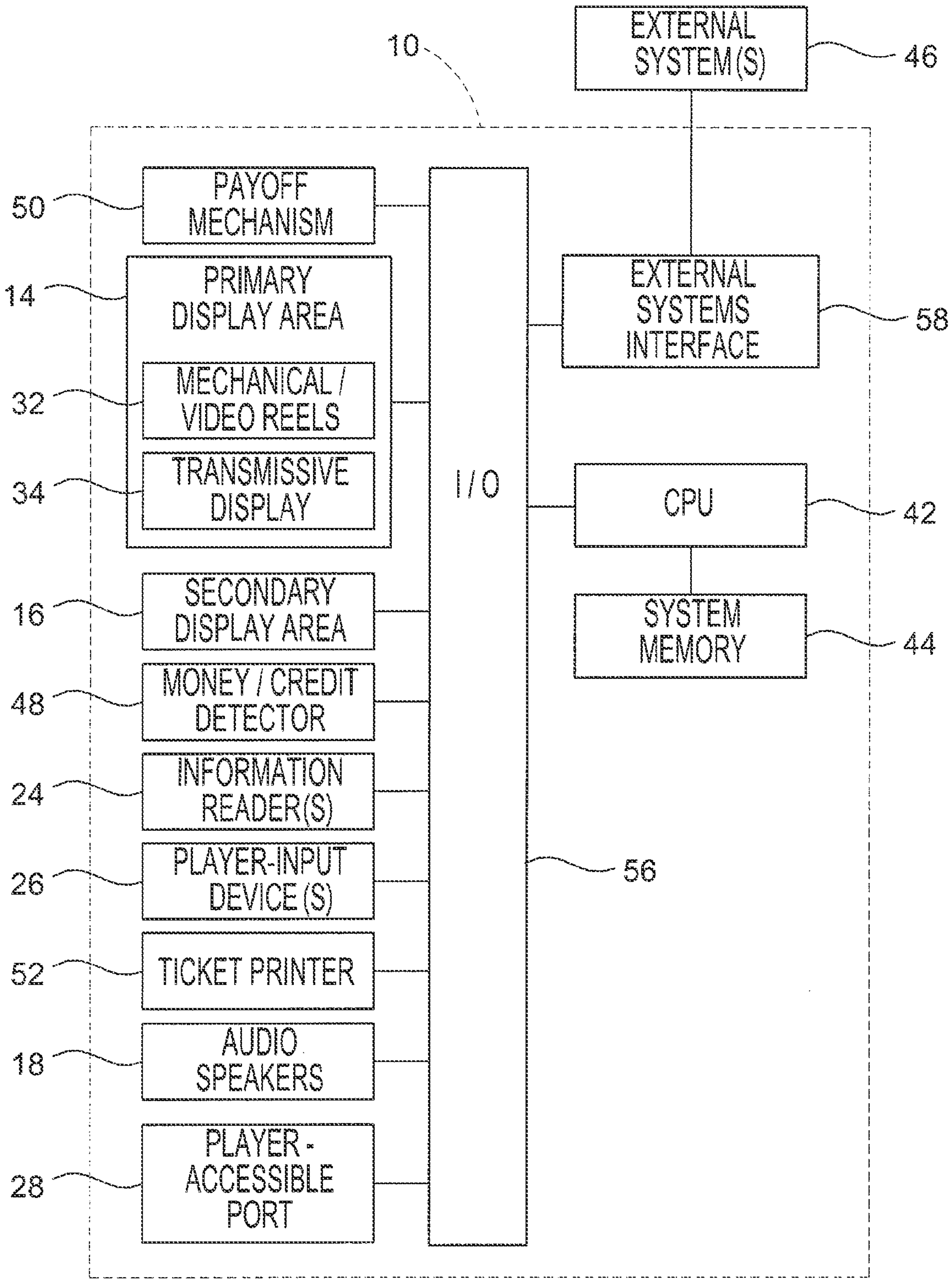
FIG. 2 (PRIOR ART)
FIG. 2 is a schematic view of a wagering game system utilizable in accord with the present concepts.

Turning now to FIG. 2, the various components of the wagering-game machine 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the wagering-game machine 10 that is configured to communicate with and/or control the transfer of data between the wagering-game machine 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the wagering-game machine 10 and is connected to the remainder of the components of the wagering-game machine 10, as appropriate, via a wired connection, such as I/O 56, or wireless connection. The money/credit detector 48 detects the input of valid funds into the wagering-game machine 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the wagering-game machine 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the wagering-game machine 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the wagering-game machine 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other wagering-game machines, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The wagering-game machine 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the wagering-game machine 10 ("thick client" wagering-game machine), the external systems 46 ("thin client" wagering-game machine), or are distributed therebetween in any suitable manner ("intermediate client" wagering-game machine).

Figure 3:
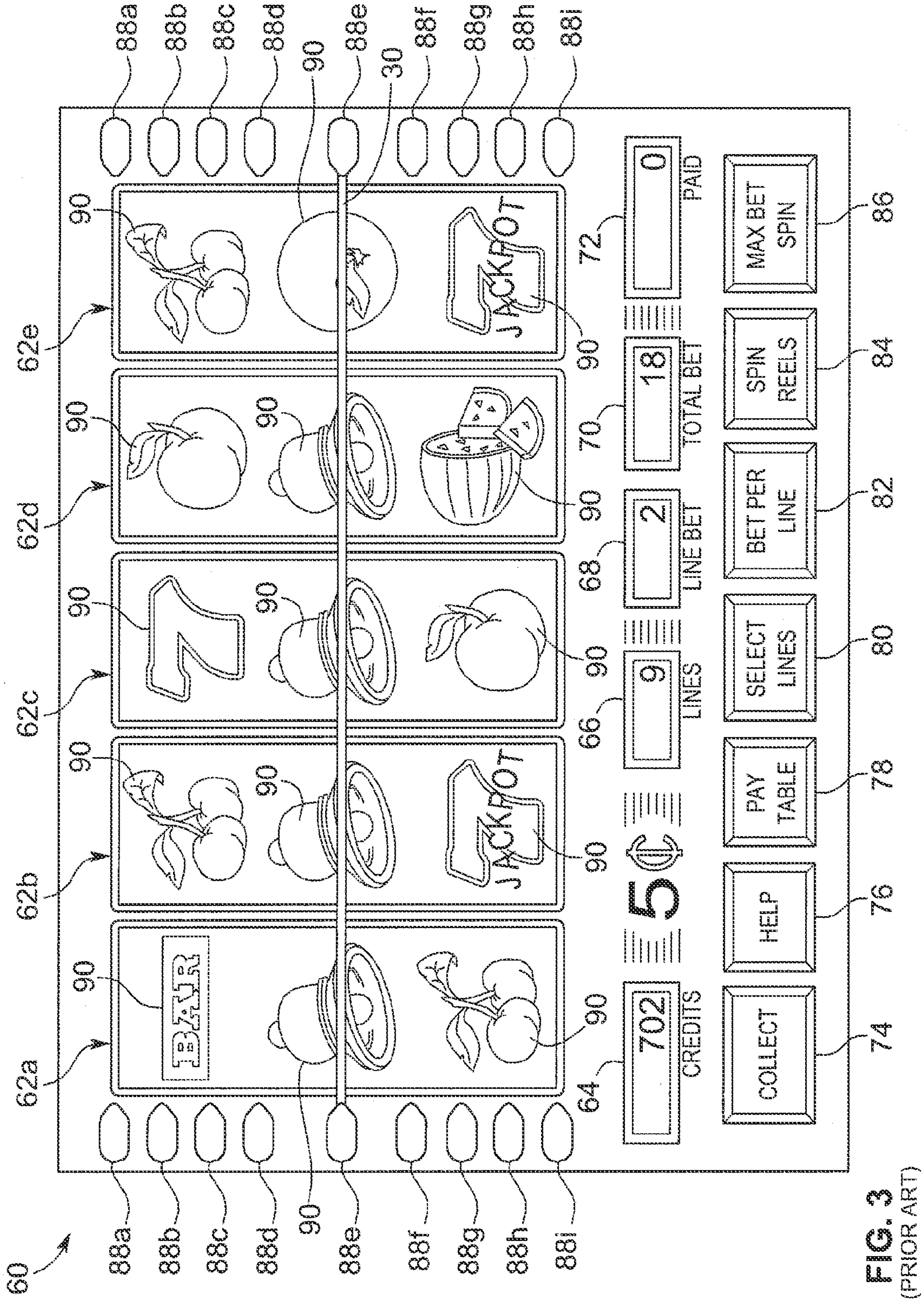
FIG. 3 (PRIOR ART)
FIG. 3 is an image of an exemplary basic-game screen of a wagering game displayed on a wagering-game machine.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the wagering-game machine 10 depicted in FIG. 1, following receipt of an input from the player to initiate the wagering game. The wagering-game machine 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid"

meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the wagering-game machine 10 allows for these types of player inputs, the present invention does not require them and can be used on wagering-game machines having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the wagering-game machine 10 comprise a greater or lesser number of reels in accordance with the present invention.

Figure 4:
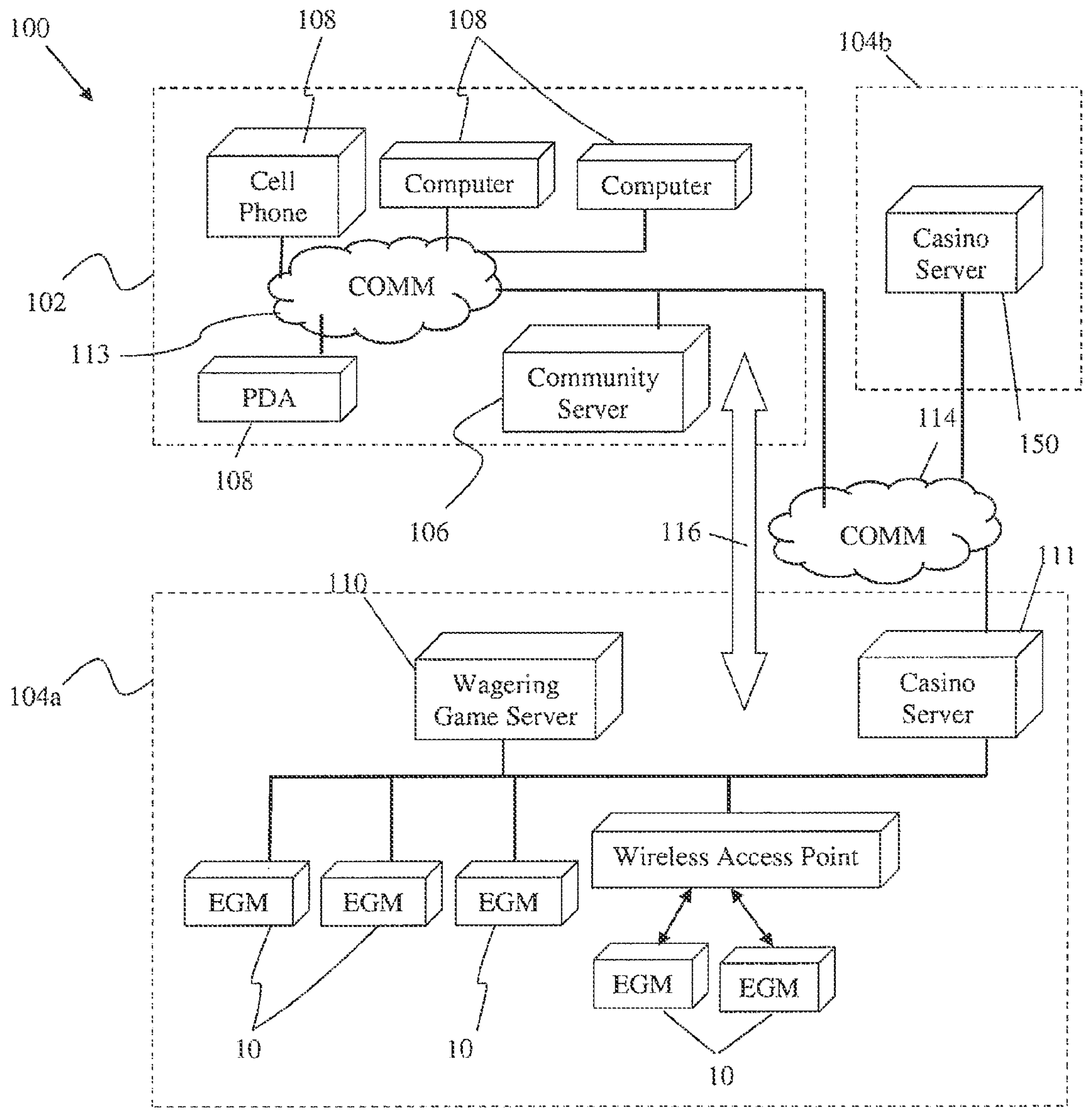
FIG. 4 is a schematic view of a wagering game system in accord with at least aspects of at least some the present concepts.

FIG. 4 is a generalized block diagram illustrating dataflow between virtual gaming community members who are on-line and those who are playing wagering-game machines 10 in a casino 104*a*, according to the present concepts. In FIG. 4, a player system 100 includes an on-line community 102 and one or more gaming establishments 104*a*, 104*b*. The on-line community 102 includes a community server 106 and input devices thereto such as, but not limited to, computers 108, cell phones 107, and PDAs 109. The community server 106 can include a web site and other facilities through which community members can interact with each other and with one or more gaming establishments. Community members can use a preferred input device, such as a computer 108, to access the community server's 106 web site and other facilities, such as a gaming-establishment server 111. In the gaming establishment 104*a*, the wagering-game machines ("EGMs") 10 are connected directly or wirelessly via a communication pathway to a wagering-game server 110 handling internal gaming establishment communications and to another gaming-establishment server 111 handling external gaming establishment communications. The wagering-game server 110 may be resident within the gaming-establishment server 111 or the functions may otherwise be integrated within a single server. The gaming-establishment EGMs 10 are thus able to send information to and receive information from the community server 106. The community server 106 is operated by an entity different (e.g., a wagering-game manufacturer) than the entity operating the wagering-game server 110 (e.g., a casino).

In the illustrative example shown in FIG. 4, the wagering-game machines 10 can exchange community information and/or wagering-game information 116 with the community server 106, which is then accessible in turn by players via computers 108 or cell phones 107. As a result, community members who are on-line (i.e., who are using the computers 108) can send information to and receive information from or otherwise interact with the wagering-game server 110 and, optionally, interact with community members who are in the gaming establishment 104*a*. Significantly, information from the gaming establishment 104*a* can be conveyed to all community members or select community members.

FIG. 4 shows a gaming establishment 104*a* wagering-game network in which wagering-game machines 10 are linked to a wagering-game server 110 that is, in turn, linked to a casino server 111 via a local area network 117. The local area network 117 may include, merely by way of example, one or more wireless access points 119 forming wireless communication links, and one or more wired communication links. The wired and wireless communication links can employ any suitable connection technology, such as spread-spectrum-signal-hopping, Bluetooth, 802.11, Ethernet, public switched telephone networks, etc. The wagering-game machines 10 in FIG. 4 can comprise any suitable dedicated wagering-game machines (e.g., floor-standing models, handheld mobile units, bartop models, workstation-type console models, etc.) or even non-dedicated devices use configured to conduct a wagering game (e.g., mobile phones, personal digital assistants, personal computers, etc.). The wagering-game server 110 can serve wagering games and/or other content over the local area network 117 and receive information from the associated wagering-game machines 10 as well as exchange information with casino server 111, an internal community client server, an external community server 106, external community interface devices or clients (e.g., computer(s) 108, cell phone(s) 107, PDA(s) 109, etc.), and other casinos 104*b*.

In at least some aspects, the community interface devices or clients (e.g., computer(s) 108, cell phone(s) 107, PDA(s) 109, tablet computers, etc.), enable community members to access a community server 106 in which they may engage in gaming activities (e.g., non-wagering game activities associated with gaming establishment wagering games) and access other services, such as information on various games and offerings, available from the community server 106 and other network components. In various aspects of the present concepts, the community interface devices can connect to a communications network 113 wirelessly or via a hardwired connection. The community server 106 can include network devices such as, but not limited to, accounting servers, wide-area-progressive servers, and/or community-member-tracking servers. Authentication certificates advantageously validate servers before allowing communications, and network traffic is secured using strong SSL encryption, with data being stored in a high-availability SAS 70 type II compliant data center. Further, the community server 106, in at least some aspects of the present concepts, advantageously requires no personally identifiable information (PII) from players.

The community server 106 is configured to facilitate content and applications to enhance player engagement and create integrated on-line (web-based) and off-line (real-life) player experiences. By way of example, the community server 106 hosts WMS Gaming's Player's Life® applications, which gives players the ability to, for example, explore WMS game features at their own speed and in accord with their own schedule, share their achievements with friends, and explore different game options they might not otherwise be willing to try on a casino floor. The WMS Gaming Player's Life® web services provides, in particular, a platform by which content may be unlocked in the on-line environment and deployed in a linked wagering-game machine during subsequent wagering-game play. In at least some aspects of the present concepts, the community server 106 (e.g., the WMS Gaming Player's Life® web service) prompts new members to create a profile to be used both on-line, using the client device or community interface device (e.g., computer(s) 108, cell phone(s) 107, PDA(s) 109, tablet computers, etc.), and across wagering-game machines in one or more casinos. The profile stores player-specific data on a per-game and/or per-casino basis and includes profile data comprising miles, medals, achievements, etc. and enables players to use this profile and identity on both casino wagering-game machines and on-line, which helps gaming establishments maintain contact with players leverage the ubiquity of the internet.

In the above context, various particular incentives in accord with aspects of the present concepts are described hereinbelow. To qualify for the incentives, a player is preferably, but not necessarily, required to log into the community server 106 from a wagering-game machine 10, such as by using an email address and password or other information to verify the player identity, so that the community server 106 and wagering-game machine 10 may communicate during the gaming session. In other aspects, a player may log into the wagering-game machine 10 and authorize game-session information to be forwarded to the community-server web service and/or otherwise have critical game-session information stored in a physical memory in association with the player for access by the community-server web service.

This latter aspect could include, for example, a player's registration at the gaming establishment **104*a* (e.g., with a gaming-establishment representative or at a kiosk) prior to a gaming session and the player's registration at the gaming establishment subsequent to the gaming session, with the gaming-session data 116 being forwarded to the community server 106, for example, by the gaming-establishment representative or kiosk. In one example, a player may log into the community server 106 directly from a wagering-game machine 10 by inputting player-identifying information (e.g., email address, biometric input, identification number, players' club card for the casino, etc.) into a user input device (e.g., via touch screen 38, information reader 24, etc.) of the wagering game terminal. By way of example, a player may not be permitted to log into the community server 106 until they have entered their player's club card. In another example, following a player's registration at a wagering-game machine using a players' card and a WMS Player's Life® identifying information, the community server 106** could contact the casino customer relationship manager ("CRM") requesting that the CRM in turn notify the player of a change in status based on the player's gaming session through the casino's internal notification system. It is presently preferred, however, to utilize direct communication with a player using a player-selected mode of communication (e.g., text message or communication to player through wagering-game machine communication device(s), email, text message to personal electronic device, posting to a Facebook account, etc.).

From a system architectural standpoint, the location and identity of each wagering-game machine in a casino is determined from the wagering-game machine Media Access Control "MAC") address, electronic gaming machine 10 ("EGM") ID, or other addressing system that uniquely identifies the EGM to the wagering-game server. When the community server 106 receives the MAC address in association with a player's log-in information (e.g., email, etc.), the community server can determine that the player is logged into a particular gaming machine at a particular casino. Thus, the community server 106 is able to differentiation between a Lord of the Rings™ 1 Box or a Lord of the Rings™ 2 Box by the EGM ID.

In accord with aspects of the present concepts, it is desired to incentivize play through differentiation of a player's experience on a particular wagering-game machine, a particular family of similar wagering-game machines, a particular class of wagering-game machines (e.g., related platforms, but potentially different games), a particular gaming establishment, and/or a particular wagering-game machine/family/class at a particular gaming establishment.

In accord with some aspects of the present concepts, a player's wagering activity at a wagering-game machine in any gaming establishment permits the player to accumulate points, miles, trophies, or other redeemable units (hereinafter optionally referred to collectively as "points" for convenience) in a secondary economy of the community server 106 provided the player's wagering activity is registered to the community server during or after wagering game play. Available incentives are communicated to the player from the community server 106, either to a player on a client device (e.g., computer(s) 108, cell phone(s) 107, PDA(s) 109, tablet computers, etc.) or to the player when the player is logged into the community server 106 from a wagering-game machine. The location-based incentive may comprise, for example, an enhanced accumulation of points (e.g., Player's Life® points) or a secondary economy currency valid only on the community server 106, additional incentives being described, by way of example, herein.

A player may accumulate such points or secondary-economy currency, redeemable only by the community server 106, for a given wagering activity or wagering activities on one or more wagering-game machines at a given location or locations. Given the location-based nature of the incentives offered to the player by the community server 106, a player's equivalent activity at a particular wagering-game machine, a particular family of similar wagering-game machines, a particular class of wagering-game machines (e.g., related platforms, but potentially different games), a particular gaming establishment, and/or a particular wagering-game machine/family/class at a particular gaming establishment, will result in an enhanced or accelerated accumulation of points (i.e., above a predetermined base level for accumulation of points) than at other such wagering-game machine(s) or gaming establishment(s) elsewhere.

Thus, based on the unique location-based criteria of the incentives, a player playing at a first gaming establishment may receive a first predetermined number of points (e.g., points having non-cash value in a secondary economy) for a predefined unit of wagering activity (e.g., $100 wagered), whereas the same player playing at a second gaming establishment would receive a second predetermined number of points for the predefined unit of wagering activity, where the first predetermined number of points is greater than the second predetermined number of points. Likewise, a player playing at a first wagering-game machine may receive a first predetermined number of points (e.g., points having non-cash value in a secondary economy) for a predefined unit of wagering activity (e.g., $100 wagered), whereas the same player playing at a second wagering-game machine would receive a second predetermined number of points for the predefined unit of wagering activity, where the first predetermined number of points is greater than the second predetermined number of points. In one example, a player entering a gaming establishment trying to decide whether to play a Buffalo Spirit™ wagering-game machine or a Zeus wagering-game machine, both manufactured by WMS Gaming Inc. of Waukegan, Ill., a player may know from prior wagering activity on the Zeus wagering-game machine at that casino and/or activity on the community server 106, such as the WMS Gaming Player's Life® Web Services, that wagering on the Zeus wagering-game machine will provide enhanced accumulation of points on the community server over an equivalent amount of play on the Buffalo Spirit™ wagering-game machine for which the player has no location-based incentive.

Moreover, in accord with some aspects of the present concepts, repeat play at the same gaming establishment and/or same gaming machine (or gaming machine family or class, if applicable) can result in incremental increases in the enhancements provided to accumulation of points in the web service, such as WMS Gaming Player's Life® Web Services, to provide continuing enhancements to incentives to return to the same gaming establishment and/or same gaming machine(s). To illustrate, if it were assumed that a points multiplier was incrementally increased by 10% each time a player returned to play any wagering game at a predetermined gaming establishment (e.g., a selected "home" gaming establishment), then a player would understand that continued play at that "home" gaming establishment would yield continually accelerated awarding of points or miles or some other unit.

Acceleration incentives for repeat play on a particular wagering-game machine and/or at a particular casino may be applied not only to points redeemable on-line within the community server 106 or in relation to unlockable content that may be deployed by the player within the community server (e.g., trophies, custom trophies, skins, custom artwork or graphics, achievement points, status, etc.) or in association with a wagering game at a wagering-game machine 10, but also to points redeemable as comps within the casino in which the points are earned. Thus, the incentives may be applied as a points accelerator to earn other incentives or comps such as, but not limited to, free buffets, free shows, coupon play, drinks, etcetera.

As to the concept of custom skins, custom artwork or graphics, or even custom audio or music, wagering games connected to the community server 106 (e.g., WMS Gaming Player's Life® enabled G+® wagering-game machines) can be advantageously modified to represent a player's status. For example, a player achieving status on a Kronos G+® wagering-game machine is awarded a Kronos graphical and/or audio content that can be overlaid over or combined with corresponding graphics or audio content on another WMS Gaming Player's Life® enabled G+® wagering-game machine, such as Dragon's Fire or Winter Wolf, or on any other WMS Gaming Player's Life® enabled wagering-game machine. By way of example, the graphical content could comprise a GUI or game skin and the audio content could comprise music (e.g., even selectable music content by the player) or sound effects. When the player logs into the respective community server 106 enabled wagering-game machine, they are enabled to apply any desired incentives that they have unlocked or achieved. The player is thus able to effectively personalize their community server 106 enabled wagering-game machine to differentiate themselves and publicize their achievements, such as by different graphical representations on the primary display, secondary display, and/or area display. Other players may thus recognize that a player at another wagering-game machine has a black screen instead of a blue screen, or that that the playing cards have different graphics, or the like.

With the aforementioned examples in mind, the issue of notification of incentives will now be addressed before providing additional examples of incentives. In one aspect of the present concepts, wherein a player has previously provided their email address or cellular phone number to a community server 106, such as the WMS Gaming Player's Life® Web Services, an email invitation or text notification may be sent to the player's email address or telephone if the player has enabled such avenues of communication. In another aspect of the present concepts, wherein a player has previously registered with a community server 106, such as the WMS Gaming Player's Life® Web Services, a player logged into a wagering-game machine may receive notification(s) via pop-ups, text windows, IM windows, or the like on the primary display 14 or secondary display 16 of the wagering-game machine. Optionally, a player may be permitted to selectively enable or disable such avenues of communication at least during wagering game play. In one advantageous implementation, the community server 106 is managed and operated directly by, or alternatively on behalf of, a gaming machine manufacturer, such as WMS Gaming Inc. In another aspect, such gaming machine manufacturer may configure the community server 106 to enable third parties, such as casinos, to operate in a peer-to-peer network.

In one aspect, a player may be informed of incentives, either or both of current incentives awarded during the gaming session or future incentives, only upon logging into a wagering-game machine or upon termination of a gaming session at a wagering-game machine (e.g., cashing out). By way of example, a player logging into a wagering-game machine in association with their web services account (e.g., WMS Gaming Player's Life® Web Services) is informed that, if the player returns to this particular gaming machine on another day within a predefined time period (e.g., within 3 days, one week, one month, etc.), they will receive a first incentive (e.g., enhanced benefit) regarding their web services account and if the player returns to this particular gaming establishment and registers activity in association with their web services account on another gaming machine on another day within the predefined time period (e.g., within one month), they will receive a second incentive, different from the first incentive, regarding their web services account. In yet another aspect, a player may be informed of incentives when directly logged into the community server 106, such as the WMS Gaming Player's Life® Web Services via a personal computer, smart phone, etc.

To illustrate one example of one of the above concepts, a player conducts a gaming session on a wagering-game machine and logs into or otherwise associates his or her gaming session with his or her web services account. The player leaves the gaming establishment and goes home. Following completion of the gaming session, the community server 106 transmits to the players identified email address or cellular telephone number a communication thanking the player for their patronage at the gaming establishment and stating that, if they return to the gaming establishment within a specified time period (e.g., three days), they will receive an incentive, such as an award of points in the web services account at an accelerated rate (e.g., 1.5×, 2.0×, 3.0×, etc.). Optionally, follow-up emails or other communication can also be sent to the player, with revisions as appropriate to the specified time period and revisions to the incentive, if applicable. Thus, the community server 106 may manage, for example, casino-specific and/or wagering-game-specific accelerator campaigns.

In one optional aspect, the communications and incentives are varied in accord with a player's prior gaming session or wagering history at the specific wagering-game machine or gaming establishment. Thus, a player having achieved a net win in an immediately prior gaming session would receive a different message or a different incentive than a player having suffered a net loss in an immediately prior gaming session. To the extent that the community server 106 is informed by the wagering-game machine 10, wagering-game server 110, or casino server 111 of turnover, individualized points and content may be advantageously provided to the player by the community server 106. For example, if a gaming establishment indicates to the community server 106 that a player has a turnover of $500 on a particular machine, a player may then be provided with an extra benefit or incentive as to that particular machine or as to that gaming establishment. As one example of content that may be unlocked by a player, a special royal-flush card art is available for subsequent use at the casino (and advantageously on-line over the community server 106) in which that content is unlocked by the player achieving a royal flush at that casino.

In at least some aspects of the present concepts, the incentives and benefits are exclusive to the availability of on-line content over the web-service only, whereas in other aspects, the incentives and benefits translate to the availability of non-EV-related content on a wagering-game machine 10 over the casino server 111 and/or wagering-game server 110. In the former aspect, the wagering-game manufacturer does not have to address regulatory issues of approving even benign post-installation modifications to wagering-game machines. Instead, the gaming establishment can independently verify to the community server 106 that a player has completed a given milestone (e.g., $500 turnover on a particular machine), at which point the player would then be enabled to access corresponding incentives and/or benefits. For example, a player fulfilling a predetermined condition at a Harrah's poker wagering game may be granted a benefit, on the community server 106, of new card graphics bearing a Harrah's logo or theme in an on-line free poker game on the web service. As another example, a player fulfilling a predetermined condition at a Bellagio wagering-game machine may be granted a benefit, on the community server 106, of new trophy with graphics evocative of the gaming experience at Bellagio.

In the above examples, it may be desired to provide the verification of the relevant player's gaming-session data to the community server 106 by proxy through representatives of the gaming establishment. However, it is advantageous to configure the wagering-game machine 10, wagering-game server 110, and casino server 111 to automatically provide at least basic gaming-session information (e.g., player ID, machine information, location information, date, duration of play) and preferably, but not necessarily, wagering-history information (e.g., turnover, biggest wins, biggest wager, average wager, etc.) to the community server 106. The data collected from the last gaming session can then be analyzed to determine which incentive(s)/benefit(s) apply to that player and to communicate this information to the player.

As it is problematic, from a regulatory perspective, to change wagering-game software after the software has been baked into the wagering-game machine, a wagering game may be advantageously pre-programmed with skins, overlays, or graphics representing a plurality of different, authorized casino-branded graphics that may then later be enabled.

However, it is conventionally difficult to modify wagering-game machines to permit downloading of new assets, such as a new award graphic (e.g., a new trophy for winning Lord of the Rings™ twice). In one aspect of the present concepts, a centralized repository of game graphics is provided in association with a wagering-game server and updates to the game graphics for a plurality of wagering games may be simultaneously achieved with a single update to such centralized repository of game graphics and the programming that is baked into the wagering-game machine contains pointers to the requisite data structures within the centralized repository of game graphics that contain the relevant graphics.

In one aspect of the present concepts, the community server 106 and/or a community client resident in or associated with the wagering-game server 110 and/or an individual wagering-game machine 10, can store and track information on the players from the community that register their wagering game play on a wagering-game machine 10 using their community-server identification information (e.g., email address, player-selected ID, etc.).

In another aspect of the present concepts the content that is unlocked by a player via the accumulation of points is a sneak preview of a bonus that remains locked to a player or even of a new game that is yet to be released. An incentive may then be provided to a player to unlock this content permanently by requiring the player to satisfy various milestones, such as by accumulating a predetermined number of miles in a miles-base journey-type game (e.g., in the WMS Gaming Lord of the Rings™ game in which different distances along a path comport with different available bonuses). For example, a player may be informed by the community server 106 through a wagering-game machine 10 that, if the player returns once a week and logs into the wagering-game machine, they can maintain their status while still earning points or miles for long term unlockability. Thus, the sneak preview part of it only works as to the particular location (e.g., casino or wagering-game machine) at which the player received the sneak preview, although the points or miles accumulated are global. By way of example, if a player were playing the WMS Gaming Kronos™ wagering-game machine, and WMS was going to be soon releasing a Kronos 2™ wagering-game machine, there would naturally be a lot of unlockable content in Kronos 2™. A player having achieved a certain status in Kronos™ (e.g., the "Mayor" of a particular Kronos™ wagering-game machine may receive a communication from the community server 106 that the locked content of Kronos 2™ is being unlocked for the player under predetermined conditions (e.g., for one day) and may optionally be unlocked permanently for the player at that wagering-game machine under other stated conditions (e.g., if they come back every day or once a week for the next 10 weeks). In some instances, the status of the player on the wagering game may further require that they have unlocked all unlockable content on the wagering-game machine in question before being permitted sneak picks to another game or before being permitted to unlock content on the other game.

In another example, if a community server 106, such as the WMS Gaming Player's Life®, has enabled content for a first wagering game (e.g., WMS Gaming Star Trek™) wherein the player has achieved a certain number and/or type of medals during play of the first wagering game and/or on-line games relating thereto, the community server 106 may advantageously unlock content for that player on a second wagering game. Such unlocking of content for a player on another wagering game may optionally be conditioned upon continued play by the player on the first wagering game (e.g., the player must play with a certain periodicity or maintain a certain status on the first wagering game). If the player does not maintain such conditions, then the content on the second wagering game will again be locked and will then be unavailable to the player. This can be particularly beneficial to high-volume players that achieve more points, miles, or the like than they can reasonably capitalize on for a given wagering game and permits them to utilize their status on the first wagering game to benefit them on a different wagering game so long as they continue to maintain their status at the first wagering game (e.g., a particular wagering game, a particular wagering game on a particular wagering-game machine, etc.), such as by playing with a certain periodicity (e.g., once a week, once every two weeks, etc.). In this hybrid incentive model, a player playing a first wagering-game machine (e.g., WMS Gaming Star Trek™) can thus unlock content for a second wagering-game machine (e.g., WMS Gaming Lord of the Rings™) in the same general location. The unlocking of the content on the second wagering-game machine may be optionally premised upon not only a player's maintaining of their status on the first wagering-game machine, but may also be made contingent upon the players play of the second wagering-game machine (e.g., a certain number of plays, a certain periodicity of play, etc.).

Accordingly, through this hybrid approach, the present concepts can be used to incentivize playing more than one game at one time. This hybrid approach is particularly advantageous when a first wagering game is going to be transitioned out in favor of a new wagering game (e.g., a third wagering game) and allows a player to establish continuity with another wagering game (e.g., a second wagering game) prior to such transition and to possibly, as noted above, receive a sneak peek into the content of the yet-to-be-released third wagering game. As another example, if a casino knows that it will be replacing the WMS Gaming Lord of the Rings™ with a WMS Gaming Super Team wagering game, the community server 106 can push content to the wagering-game machines that are on the casino floor to enable a player triggering a bonus in the Lord of the Rings™ wagering game to pick any bonus that's in Lord of the Rings™ and, optionally, to additionally select to play a pre-release Super Team bonus, for entertainment only, so that the player can become used to the content.

Parameters for ranking such community players based on one criteria (e.g., number of log-ins, amount of coin-in, highest payout, etc.) or on more than one criteria, which may be weighted toward one or more of the criteria, are used to establish a player's rank within the community. For example, the wagering-game server 110 can count how many times a player visits a certain wagering-game machine and based on that number of visits, the player can be ranked higher than other players who visited the wagering-game machine a lesser number of times. Such player would then be designated as the leader, Mayor, King, General, President, or the like, with corresponding lower levels of ranking having lesser titles in a given theme.

This ranking and theme could advantageously be carried over into the community server 106, where the player's exploits are heralded. In this way, player can assert, at least temporarily, some ownership or dominion over a particular wagering-game machine. So, if a player becomes the Mayor of Zeus, machine number 3 on bank number 2 in Harrah's by obtaining the biggest win ever on that wagering-game machine, until somebody gets a bigger win, the player feels like they own that wagering-game machine. Optionally, the wagering-game machine may be configured to provide personalized treatment to a player based on the player's ranking and identification of the player by the wagering-game machine (e.g., player's club ID, community ID, biometric input, email address, etc.), so that the player receives special treatment befitting the player's rank at that wagering-game machine. Thus, a player's interaction with the wagering-game machine, and possibly the graphical user interface itself or visual elements of the wagering game or wagering-game machine, may advantageously be made to differ based on a player's ranking. Further, such player may be notified via email, text, or other form of communication if their ranking is threatened, permitting the player to address the threat, if desired, through additional wagering game play at the gaming machine.

In at least some aspects, the player's ranking is associated with continuing benefits available to the player on-line when connected to the community server 106 web service. In other aspects, the player's ranking is associated with continuing benefits available to the player when playing, at the gaming establishment where the ranking was earned or optionally a related gaming establishment, a wagering game on the wagering-game machine 10 for which the ranking was earned. Optionally, the player's ranking is associated with continuing benefits available to the player when playing, at the gaming establishment where the ranking was earned or optionally a related gaming establishment, a wagering game on bank of machines positioned adjacent to the wagering-game machine 10 for which the ranking was earned. Optionally, the player's ranking is associated with continuing benefits available to the player when playing, at the gaming establishment where the ranking was earned or optionally a related gaming establishment, a wagering game on any wagering-game machines made by the same manufacturer as the wagering-game machine 10 for which the ranking was earned.

As one example, the benefit may be obtaining player points, player miles, etc. applicable to the community server 106 at an accelerated rate (e.g., via multipliers, higher points per dollar wagered, higher points per mile traveled in mileage-based game, etc.) while the rank is maintained. Merely by way of example, a top status in a game (e.g., Mayor) could carry with it an accelerator of 10× for future wagering game play under stated a stated condition or conditions (e.g., for wagering activity at the same wagering-game machine and at the same casino, etc.), with lesser rankings receiving progressively lower and lower accelerators. In another aspect, which may be combined with the acceleration concept or employed separately, the rankings may be associated with various privileges or benefits which may be, for example, a one-off multiple on a Player's Life® points or something else outside of the secondary economy. As another example, a higher rank results in a change of acceleration to make further advancement more easily attainable. For example, if a player is a Knight, the player receives a bonus mile for every 20 miles traversed in a game, whereas if the player is a Prince, the player receives a bonus mile for every 10 miles traversed in the game, and for a King, the player receives a bonus mile for every 2 miles traversed in the game. As another example, as the player moves through different ranks, a player's game graphics are altered to reflect a player's increased rank. If the player's rank decreases, of course, the player loses the corresponding privileges or benefits.

The aforementioned stated condition or conditions by which the benefit may be obtained (and/or retained) may further impose limitations conditioned on continuing wagering game play. For example, a rank may decrease, by operation of a schedule wherein one level of rank is lost for each bi-week that passes with no wagering activity at that particular property by the player. Additionally, a player may have to contend with a limited population of ranks (e.g., there can be only one King) so that a player would have to be mindful not only of schedule limitations, but also competition from other players, such as in the vein of a player leader board. Thus, despite a player's massive score and high rank, the rank may automatically reset to zero or decrement by one or more ranks following a predetermined time (e.g., one day, three days, one week, two weeks, etc.), at which point the ranks revert to the next player with the highest score corresponding to that rank.

Yet additional benefits may be bestowed upon a player if they are able to retain a high ranking despite operation of factors, such as scheduled decrementing of rank, against the player. For example, if a player is able to attain a predetermined rank and maintain it for a predetermined consecutive number of cycles of wagering game play (e.g., 3 weeks, 4 weeks, etc.), the conditions upon the player may ease to make retention of the rank somewhat easier and/or to make the benefits of the rank even more beneficial (e.g., additional accelerators, retention of rank accelerations for a predetermined during even after rank is lost, etc.).

Optionally, a decay rate or other temporal limitation may be imposed on any achieved ranking. For example, if the ranking is based solely on the highest win amount and there are no such temporal limitations on the ranking, the player achieving the highest win amount will forever benefit from that win. It may be desirable to periodically decrement a player's ranking, such as by lowered the player's rank by one rank or unit per a predefined unit of time (e.g., week, month, quarter, etc.).

To drive traffic into the casino, the community server 106 optionally may notify players, via email, cell phone, Facebook, or other authorized mode of communication, of an impending retirement date for the game on which they each have a ranking in jeopardy. The players are thus afforded an opportunity to solidify or enhance their ranking before the game is retired.

From time to time, a casino may desire to remove a first game (e.g., Kronos) and replace it with a second game (e.g., Buffalo Spirit™), utilizing the same wagering-game machine 10 (e.g., a WMS Gaming G+® Deluxe platform). In this instance, at the time of the retirement of the first game could advantageously be used to institute a "Hall of Frame" or the like for the ranked players at the retirement of the first game, so each player's ranking, or perhaps only the highest ranking player, is permanently enshrined in the community server 106. Advantageously, the ranked player or ranking players may be awarded a retirement award or pension of points, miles or the like, to commemorate the one-time achievement. In another aspect, the rankings may be provisionally carried over into the second game until such time as they are overcome by wagering activities of new players, decremented over time, or both. In still another aspect, a player's rank upon the retirement of the first game may be utilized by the player to obtain a similar status while playing the first game at another wagering-game machine. For example, if the player was a Mayor at the end of the life of a particular Kronos machine, that was then converted into a Buffalo Spirit™ machine, the player may enjoy his or her Mayoral status at another Kronos machine or at all Kronos machines in the casino.

The final ranking of a player may also be used to permit a sufficiently highly ranked player, such as the top ranked player, to access that game via a downloadable option, either via the community server 106 in an on-line (e.g., non-wagering) capacity or at a wagering game terminal configured to enable downloadable content where a player is empowered to select from one of a plurality of available games. In the latter instance, only the top ranked players may be the only ones that are able to recall the game on which they were the top ranked player. In other words, the ranking may convey exclusivity with regard to downloading of past content. Thus, even when a game is long retired, a player having earned the right to download the game can access and play the game at will at the casino in which such right had been earned, or in a related casino, on gaming platforms configured to enable such downloadable content.

Similarly, leaderboards, or simply status boards, can display particular achievements of players that are not related or not necessarily related to a player's ranking. For example, a player may achieve a particular trophy or unlock particular content that is somewhat unique (e.g., the Stanley Cup in a hockey-themed game) and the player is given special recognition on the status board, either with or without award of some other non-monetary benefit.

The rankings may also be used, during the standard operational life of the game, to permit syndicate play wherein the top ranked player(s) are enable to appoint one or more aides (i.e., other players), identified by community ID, email address, or the like. The ranked player(s) would then receive accelerated points, miles, or the like on the community server 106 for the subsequent wagering player of the aides on the wagering-game machine and the aids in turn would receive some acceleration of points or the like. For example, this manner of syndicate play for WMS Gaming Player's Life® points fosters team unity and enhances overall game play. Optionally, it may be required that each aide also have a casino player's club card so that only those having both a community ID and a Player's club card can join the syndicate.

Formation of a syndicate opens up other options and incentives for wagering game play. For example, a busy player may be confronted with some difficulty upon receiving a message that, if they return to the casino and play the same game within 7 days, they will receive an incentive (e.g., WMS Gaming Player's Life® points). In contrast, under a syndicate, an option for an incentive to the player can permit the player to have any member of the syndicate go to the casino to play the same game within 7 days to receive the incentive (e.g., WMS Gaming Player's Life® points) for the team or to individually receive the incentive and to keep the option open for other members of the syndicate. Thus, if the player sends someone from his or her syndicate, an incentive can be satisfied and/or remain open so long as someone from the syndicate comes in within a specified window of time and play the wagering game.

In the above-described syndicate aspects of the present concepts, not only are players incentives to enroll new players (e.g., into a casino's player's club which may optionally be required for syndicate play) for their own benefit, but it has the added effect of increasing player's club membership in, and contacts with, the relevant casino. For the syndicate itself, players in the syndicate incentivize each other, through an obligation of each player in the group to the other players, to override individual concerns and to contribute to the benefit of the syndicate.

In one aspect of syndicate play, players may be required to pay a one-time initiation fee and/or on-going service fees (e.g., daily, weekly, monthly, etc.) to enable enhanced communication offerings (e.g., regarding notification to all members of syndicate), enhanced incentives, enhanced windows of opportunity in number and/or duration to enable participation by a member of the syndicate, etcetera. Thus, players are optionally enabled to pay additional money to receive customized enhancements for the syndicate or even for non-syndicate play (e.g., participation in a drawing in which just qualified players are notified via the community server 106). In this way, the marketing of opportunities and incentives can be optimized for both casino and player(s).

In another aspect of syndicate play, there is no added cost to form a syndicate. In one variant of this aspect, participation in a syndicate is incentivized, further to the above, by recognition of the syndicate play and/or syndicate performance and/or individual performance within a syndicate within the community server 106 and/or the casino, the performance being particularized to a specific casino and optionally a specific game to which the syndicate is associated. As noted above, this recognition need not be limited to the community server 106, EGMs 10, or casino, and can manifest in other public arenas such as, but not limited to, Facebook or other user-selectable venue.

Where a player is logged into the community server 106 from a wagering-game machine 10, the progress of the player may be tracked and advantageously utilized as a motivation to tailor incentives to that player and to drive business elsewhere in the casino. For example, if a player is playing the Lord of the Rings wagering-game machine at the casino and the Attack from Mars wagering-game machines were just installed at the casino, the community server 106 is configured to communicate to the player an incentive for the player to play the Attack from Mars wagering-game machine at the casino during a predefined window of time (e.g., that day, the next day, etc.) and, if the player completes that task, they are awarded some status or content (e.g., an "Opening Night" trophy) on the community server 106 and/or on the Attack from Mars wagering-game machine 10 played by the player. The incentives, and communication offered by the community server 106, can then be used to push players from one location to another location on the basis on such incentives. The incentives, and communication offered by the community server 106, can also be used to incentivize players to play at more favorable times (i.e., lower traffic) at a particular location.

Further, additional content and incentives can optionally be provided if the player satisfies one or more location-based tasks (e.g., achieving a cherry-cherry-cherry outcome on a particular wagering-game machine, etc.) on one or more wagering games in the casino, which could be used to encourage a player to sample a plurality of different wagering games in the casino and/or sample wagering games in different areas of the casino. As another example, for a plurality of different wagering games are configured to be connectable to or connected to the community server 106 (e.g., a line of different Player's Life® enabled wagering-game machines) so that special content and/or special incentives may then be made available to the player. In one example, a player may be engaged in a scavenger hunt over a plurality of Player's Life® enabled wagering-game machines wherein at each machine a player is required to achieve a certain outcome to satisfy the requirement at that particular wagering-game machine. Once the scavenger hunt is satisfied, or alternatively won if competing against other players, the player (or winner) receives some predefined incentive and/or content that is then made available to the player via the community server 106, either exclusively on the community server 106 or available on both the community server and on one or more predefined wagering-game machines at the casino in which the predefined incentive and/or content was earned. As one example, a player could be awarded a trophy that entitles the player to play at the same location and get double points towards unlocking a bonus on the game.

Another example of additional content and incentives that can be provided via a line of different Player's Life® enabled wagering-game machines is cross-game content transference. For example, if a player really likes the Star Trek wagering-game machine and has reached a predetermined threshold, they may be provided content geared toward use on other Player's Life® enabled wagering-game machines. Thus, a player on a Player's Life® enabled Star Trek wagering-game machine may select a Star Trek deck of cards that the player can then use on a Player's Life® enabled poker wagering-game machine. The player can log into their Player's Life® account from the Player's Life® enabled poker wagering-game machine and play with their Star Trek deck of cards. The same Star Trek deck of cards could not, however, be obtained independently on the Player's Life® enabled poker wagering-game machine.

In this way, the incentives may be used to prompt players to leave a game of choice, and their comfort zone, and try a different product, while retaining some aspect of the player's game of choice. The incentives may also be used to encourage a player to go out of category, such as from a 5 reel video to a 3 reel mechanical, or to stay very much in same category and perhaps even newer machines having similar math models (e.g., similar volatility) or game play characteristics.

In view of the above-described aspects of the present concepts, one concept that is common to many of the above examples is that of providing an incentive of some sort for a player who returns to the same location, whether the same location is a particular wagering-game machine 10 and/or a particular casino. For example, as noted above, a player could escalate quicker in their points for repeat visits to a particular location. Thus, for example, each time a player returns to a particular casino and optionally wagers a minimum amount of a particular wagering-game machine, their multiplier for that wagering-game machine increases (e.g., the first return visit the multiplier for points is a 1.2×, the next return visit the multiplier for points is a 1.4×, etc.).

Optionally, these incentives may be maintained so long as there is nothing that breaks the chain of location based activity. Thus, a player's status may optionally be reset or decreased for location based activity at another location (e.g., another casino). Whereas conventional player's clubs are independent of a player's activity elsewhere, and frequently players are commonly members of multiple player's clubs at different casinos, the community server 106 is optionally configurable to discourage play by a player at another casino. Conventionally, if a player is a platinum member at Harrah's, it doesn't matter where else you're playing as long as the player has their platinum status at Harrah's. In other words, the player's platinum status is not location based and the player can't play with any platinum-based incentives outside of Harrah's network.

The location based incentives discussed above have principally been premised upon a location of the wagering-game machine or casino in a physical sense. However, the location can be something other than just the actual physical location. The concepts herein apply equally to web-based services, such as accessing the community server 106, such as the WMS Gaming Player's Life®, through a casino portal or link on the casino website. Thus, a player who is at home may use his or her computer to access the casino website and, through the casino website, access the community server 106 to engage in activity thereon. In this context, the incentives can relate directly to the player's website activities. For example, if the player accesses the WMS Gaming Player's Life® through the Harrah's portal, that may provide the player access to a special game or graphics (e.g., a Harrah's Mahjongg game) that the player can only get by coming to the WMS Gaming Player's Life® though the Harrah's portal. Thus, if the player went directly into the WMS Gaming Player's Life® via www.playerslife.com, they wouldn't be able to access the Harrah's Mahjongg game. In this context, the added content is location based in that it is enabled based on where the player is coming from (e.g., a particular web location).

In a simple form incentives such as miles, points, medals, trophies or the like that are earned by a player while playing a wagering game are transmitted by the EMG 10 to the community server 106 and the player is informed at the EGM upon attainment of the incentive and/or termination of play that if they log in to access the community server they can find out what those incentives are worth. When the player logs into the community server 106, they find out what the incentives are worth (e.g., scratch off tickets online that allow the player to play a certain game or a certain number of levels of a game, successful completion of which could entitle the player to a download, such as an MP3, a screen saver, a ringtone, a virtual good, or the like).

Embodiments contemplated as falling within the spirit and scope of the disclosed concepts are set forth in the following claims.

What is claimed is:

1. A method of implementing a wagering incentive across a plurality of distinct networks, the first network being a non-wagering network operated by or for a first entity and the second network being a wagering network operatively associated with a wagering-game machine operated by or for a second entity distinct from the first entity, the method comprising:

offering, via a communications controller of a community server in said first network, an incentive to a participant of said first network to play a wagering game on said wagering-game machine of said second network;

receiving information from the second network comprising wagering-game machine gaming session information relating to a player's gaming session on said wagering-game machine;

determining, using a processor operatively associated with said first network, a number of points to be awarded in association with the gaming session information;

adding, using the processor operatively associated with said first network, said number of points to a number of points stored in a player profile to yield a total number of points stored in the player profile;

comparing, using the processor operatively associated with said first network, the total number of points stored in the player profile to a total number of points stored in other player profiles for said wagering-game machine or comparing the total number of points stored in the player profile to a ranking schedule for said wagering-game machine;

determining, using the processor operatively associated with said first network, if the total number of points stored in the player profile corresponds to a higher rank in said ranking schedule for said wagering-game machine compared to a threshold rank in said ranking schedule associated with the number of points stored in the player profile; and increasing, using the processor operatively associated with said first network, an incentive available in association with said player profile on said first network or on said wagering-game machine of said second network if the total number of points stored in the player profile corresponds to the higher rank.

2. The method according to claim 1, wherein a plurality of predefined ranks are set forth in said ranking schedule, and wherein each of said predefined ranks corresponds to a predetermined point accelerator.

3. A method of implementing a wagering incentive, the method comprising the acts of:

storing in association with a first player profile, on a non-transient physical computer readable medium, wagering game machine gaming session information relating to a first player's gaming session on a wagering game machine operatively associated with a wagering network of one or more wagering game machines;

determining, using a processing device operatively associated with said non-transient physical computer readable medium, a number of points to be added to a first player profile point total based on the wagering game machine gaming session information;

using the processing device, adding the number of points to the first player profile point total stored in the non-transient physical computer readable medium; comparing, using the processing device, the first player profile point total to point totals in a plurality of second player profiles stored in the non-transient physical computer readable medium;

determining, responsive to the act of comparing, a rank of the first player based on the first player profile point total relative to the point totals of second players and corresponding ranks of the second players based on the point totals of the second profiles relative to the first player profile total;

causing a first benefit to be provided to the first player at the one or more of the wagering game machines, via the processing device, responsive to the rank of the first player exceeding at least one of the corresponding ranks of the second players;

communicating the rank of the first player and the corresponding ranks of the second players between a non-wagering network community server and the wagering network; and causing a second benefit to be provided to the first player at the non-wagering network community server, via the processing device, responsive to the rank of the first player exceeding at least one of the corresponding ranks of the second players.

4. The method according to claim 3, wherein the wagering game machine gaming session information comprises one or more of a number of visits to the wagering game machine, a count of a number of logins to the wagering game machine, a cumulative amount of coin-in to the wagering game machine, or a highest payout of the wagering game machine.

5. The method according to claim 3, wherein the wagering game machine is configured to provide personalized treatment responsive to a player rank and identification of the first player to the wagering-game machine.

6. The method according to claim 5, wherein the benefit comprises a personalized graphical user interface or wagering game visual elements mapped to the rank of the first player.

7. The method according to claim 3, further comprising the act of: issuing a communication to a player communication device if a player rank is altered or if a margin between the rank of the first player and a rank of at least one of the second players decreased below a threshold level.

8. The method according to claim 3, wherein the first benefit comprises an accelerated collection of player points, with increasing player ranks providing increasing levels of accelerated collection of players points.

9. The method according to claim 8, wherein the accelerated collection of player points with increasing player ranks is achieved via application of a rank-based multiplier or a rank-based point bonus to a number of points determined to correspond to the wagering game machine gaming session information.

10. The method according to claim 3, further comprising the acts of:

decrementing a number of points from the first player profile point total responsive to an occurrence of a trigger condition;

comparing, using the processing device, the decremented point total to the point totals in the second player profiles;

determining, responsive to the act of comparing, the rank of the first player relative to the point totals of second players and the corresponding ranks of the second players; and causing, via the processing device, a third benefit to be provided to a player at one or more of the wagering game machine, a gaming establishment in which the wagering game machine is disposed, or another wagering game machine manufactured by a same manufacturer as that of the wagering game machine, based on the rank of the first player.

11. The method according to claim 3, wherein the trigger condition comprises one of a lapse of time in accord with a schedule for decrementing points from the first player profile point total, player inactivity at the wagering game machine, player inactivity at the gaming establishment in which the wagering game machine is disposed, or player inactivity at wagering game machines manufactured by the same manufacturer as that of the wagering game machine.

12. The method according to claim 3, wherein the trigger condition comprises a lapse of time in accord with a decay rate assigned to the player profile point total or the rank of the first player.

13. The method according to claim 3, further comprising:

providing an additional benefit to a player, via the processing device, responsive to a player maintenance of a minimum predetermined player rank for a predetermined period of time.

14. The method according to claim 3, wherein the second benefit at the non-wagering network community server comprises access to downloadable content via the non-wagering network community server.

15. The method according to claim 14, wherein the downloadable content comprises one or more games.

16. A system for implementing a wagering incentive, the system comprising:

a non-transient physical computer readable medium;

a wagering game machine configured to conduct a wagering game; and a processing device communicatively coupled with the non-transient physical computer readable medium and the wagering game machine, wherein the processing device is configured to determine, from gaming session information relating to a first player's gaming session on the wagering game machine operatively associated with a wagering network of one or more wagering game machines, a number of points to be added to a first player profile point total stored in the non-transient physical computer readable medium, wherein the processing device is further configured to add the number of points to the first player profile point total and to compare the first player profile point total to point totals in a plurality of second player profiles to determine a rank of the first player based on the first player profile point total relative to the point totals of the second player profiles and corresponding ranks of the second players based on the point totals of the second profiles relative to the first player profile total, wherein the processing device is further configured to cause a first benefit to be provided to the first player in a subsequent gaming session at the one or more of the wagering game machines, responsive to the rank of the first player exceeding at least one of the corresponding ranks of the second players, wherein the processing device is further configured to communicate the rank of the first player and the corresponding ranks of the second players between a non-wagering network community server and the wagering network, and wherein the processing is further configured to cause a second benefit to be provided to the first player at the non-wagering network community server responsive to the rank of the first player exceeding at least one of the corresponding ranks of the second players.

17. The system according to claim 16, wherein the wagering game machine gaming session information comprises one or more of a number of visits to the wagering game machine, a count of a number of logins to the wagering game machine, a cumulative amount of coin-in to the wagering game machine, or a highest payout of the wagering game machine.

18. The system according to claim 16, wherein the first benefit comprises one or both of a personalized wagering game machine graphical user interface or wagering game visual elements mapped to the rank of the first player.

19. The system according to claim 16, wherein the processing device is further configured to transmit a communication to a player communication device if a player rank is altered or if a margin between the rank of the first player and a rank of at least one of the second players decreased below a threshold level.

20. The system according to claim 19, wherein the communication to the player communication device comprises a communication to a player account on the non-wagering network community server.

21. The system according to claim 16, wherein the first benefit comprises an accelerated collection of player points, with increasing player ranks providing increasing levels of accelerated collection of players points.

22. The system according to claim 16, wherein the first benefit comprises a rank-based multiplier or a rank-based point bonus applied to a number of points corresponding to wagering game machine gaming session information in a subsequent gaming session.

23. The system according to claim 16, wherein the processing device is further configured to:

decrement a number of points from the first player profile point total responsive to an occurrence of a trigger condition;

compare the decremented point total to the point totals in the second player profiles;

determine, responsive to the act of comparing, the rank of the first player based on the first player profile point total relative to the point totals of the second player profiles and the corresponding ranks of the second players; and cause a third benefit to be provided to the first player in a subsequent gaming session at one or more of the wagering game machine, the gaming establishment in which the wagering game machine is disposed, or another wagering game machine manufactured by the same manufacturer as that of the wagering game machine, based on the rank of the first player.

24. The system according to claim 23, wherein the trigger condition comprises one of a lapse of time in accord with a schedule for decrementing points from the first player profile point total, player inactivity at the wagering game machine, player inactivity at the gaming establishment in which the wagering game machine is disposed, or player inactivity at wagering game machines manufactured by the same manufacturer as that of the wagering game machine.

25. The system according to claim 23, wherein the trigger condition comprises a lapse of time in accord with a decay rate assigned to the first player profile point total or the rank of the first player.

26. The system according to claim 23, wherein the processing device is further configured to: cause an additional benefit to be provided to a player, responsive to a player maintenance of a minimum predetermined player rank for a predetermined period of time.

* * * * *